Sept. 19, 1961 E. T. OAKES 3,000,618
CONTINUOUS MIXER
Filed Sept. 3, 1958

INVENTOR
EARLE T. OAKES,
DECEASED
BY
MABEL S. OAKES AND
E. THOMAS OAKES, JR.,
HIS EXECUTORS
BY

HIS ATTORNEYS

United States Patent Office 3,000,618
Patented Sept. 19, 1961

3,000,618
CONTINUOUS MIXER
Earle T. Oakes, deceased, late of East Islip, N.Y., by E. Thomas Oakes and Mabel R. Oakes, executors, East Islip, N.Y., assignors to The E. T. Oakes Corporation, Islip, N.Y., a corporation of New York
Filed Sept. 3, 1958, Ser. No. 758,805
1 Claim. (Cl. 259—9)

This invention relates to improvements in mixing apparatus, and it relates particularly to a continuous mixer for plastic and semiplastic materials such as dough batters and other bakery products, rubber latex and other rubber compositions, and many other products.

Many plastic or semiplastic materials cannot readily be supplied to an agitating or mixing device by means of pumps or by hydrostatic or other pressure means. Moreover, many products are affected adversely in their physical properties if they are subjected to pressure during the mixing and agitating operation.

In accordance with the present invention, a continuous mixing device is provided by means of which the ingredients or components to be mixed are supplied to a mixing zone without substantial preliminary mixing or compressing, so that the texture and characteristics of the ingredients are not adversely affected by the feeding means. While the materials are directed through the mixing zone they are subjected to the kneading, mixing and shearing forces by means of sets of alternately fixed and moving blades without at the same time subjecting them to pressure of a high value. The control of pressure is particularly important in mixing the ingredients of dough, for example, and the invention will be described hereinafter with reference to a dough-mixing apparatus although it will be understood that the apparatus is not limited to use in the mixing of dough.

For a better understanding of the present invention, reference may be had to the accompanying drawing in which FIG. 1 is a view in vertical section through a typical mixing apparatus embodying the present invention;

FIGS. 2, 3, 4 and 5 are views in section taken on lines 4—4, 5—5, 6—6 and 7—7, respectively, of the apparatus shown in FIG. 1, showing quarter-segmental views of the apparatus;

Figure 1:
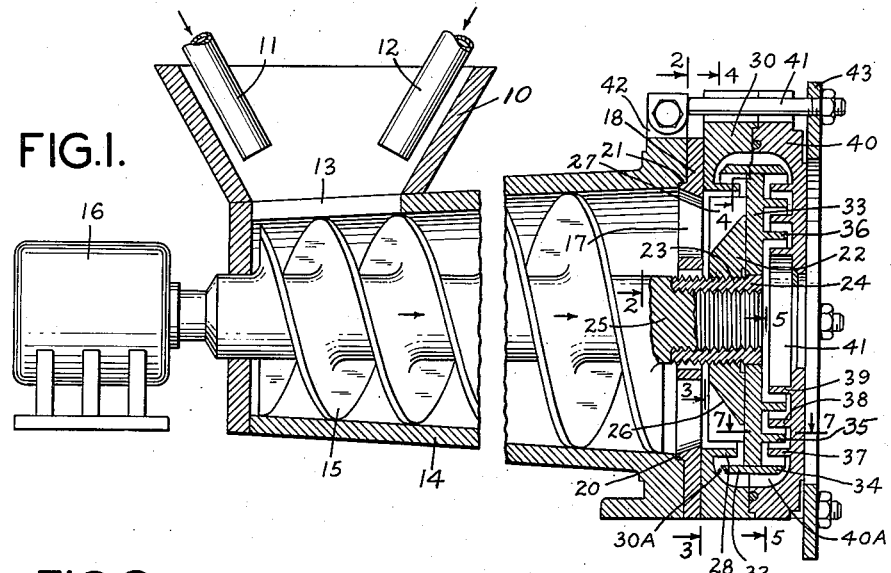
Figure 2:
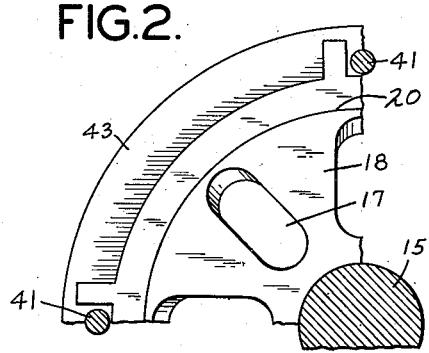

In a typical mixing apparatus used, for example, for the continuous mixing of dough, a hopper 10 is provided into which the dough-forming ingredients may be introduced by means of a hopper discharge or by means of the conduits or chutes 11 and 12 shown in FIG. 1. The materials supplied to the hopper 10 are discharged through a feed opening 13 adjacent one end of a frusto-conical casing 14 for a screw-type conveyor 15 which is driven by means of an electric motor 16 or the like connected to the end of the screw conveyor 15. Dough-forming ingredients are conveyed along the casing 14 to its right-hand end where they are discharged through a plurality of generally oval and radially arranged slots 17 in an endplate 18 secured to the outlet end of the casing 14. One side of the perforated plate 18 is provided with a generally circular projection 20 which engages in a recess 21 in the end of the casing 14 to retain the plate against lateral movement.

Figure 4:
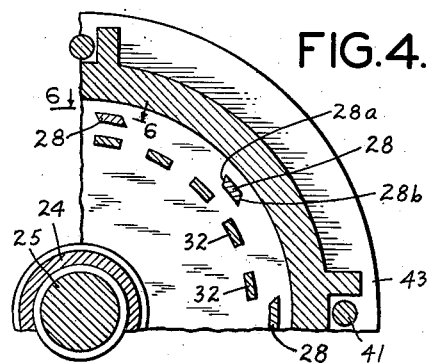
Figure 3:
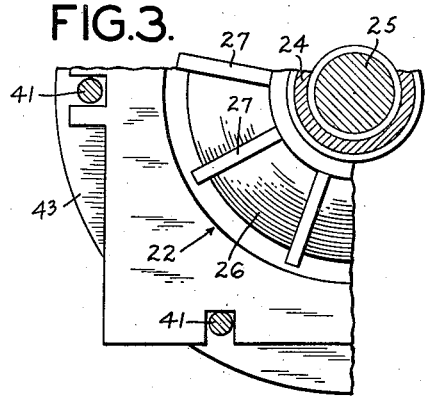
Figure 6:
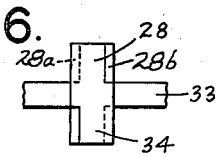
FIG. 6 is a view in section taken on lines 6—6 of FIG. 4.

The ingredients passing through the openings 17 in the plate 18 come into contact with a rotor member 22 which is detachably connected as by means of screw threads 23 to a sleeve 24 also screwed onto the extension 25 of the screw 15. As shown in FIGS. 1 and 6, the rotor 22 has a generally frusto-conical midportion 26 and a plurality of radially extending blades 27 thereon projecting outwardly from the inclined surface of the conical portion and laterally beyond its edges. In this way, the material passing through the openings 17 is subjected to a beating and agitating action, and is also directed outwardly around and through the teeth 28, which are arranged in a ring coaxial with the rotor 22 and fixed to a section 30 of the mixing head of the apparatus. As shown in FIG. 4, the teeth 28 are widely spaced. Each tooth has inclined forward and trailing ends 28a and 28b, as shown in FIGS. 4 and 6, so that it shears the material passing between the teeth. The material passing between the teeth 28 is further sheared and agitated by means of an annular row of teeth 32 carried by the mixing rotor 33 which is integral with the sleeve 24, and thus rotates with the screw conveyor 15. The teeth 32, as best shown in FIG. 4, are generally rectangular in cross-section, and are more closely spaced than the teeth 28, so that the material is kneaded and chopped repeatedly as it passes the teeth.

Figure 5:
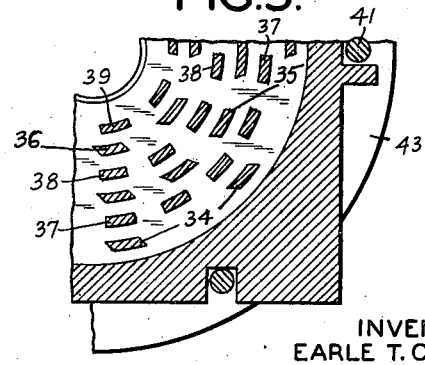
Figure 7:
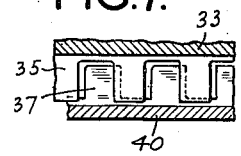
FIG. 7 is a view in section taken on line 7—7 of FIG. 1.

The material flows outwardly around the periphery of the rotor and back through a tortuous path defined, as shown in FIGS. 1 and 5, by a series of rows of teeth 34, 35 and 36 fixed to the rotor 33, and a series of stator teeth 37, 38 and 39 fixed to and extending axially of the casing section 40 of the mixing head. As shown in FIGS. 5 and 7, the teeth overlap so that the material must either flow around the ends of the teeth or pass between them, thereby subjecting it to a beating, kneading and chopping operation. The material is then discharged through a discharge aperture 41 axially located in the mixing head section 40. The sections 30 and 40 of the mixing head have internal recesses 30A and 40A for receiving the rotors 22 and 33 and flat confronting surfaces 30B and 40B. The sections are clamped together with their confronting surfaces in engagement and with the plate 18 interposed between the section 30 and the end of the casing by means of a plurality of bolts 41 which are pivotally connected to radially directed lugs 42 at the end of the casing, and extend through a clamping ring 43 which bears against the outer side of the mixing head section 40. The arrangement of the mixing head sections and the clamping means therefor is such that the entire machine can be taken apart readily for cleaning.

It will be seen from the preceding description that materials introduced into the hopper are conveyed without substantial agitation by means of the feed screw into the mixer where the products are subjected to intensive mixing, kneading, beating and shearing and thereby are intimately mixed without subjecting the materials to high pressures which might adversely affect their physical properties.

It will be understood that the apparatus can be modified, for example, to enable air or other gas to be introduced into the mixing head when foaming of the material is desired. Accordingly, it will be understood that the invention is susceptible to considerable modification and that the form of the invention described herein should be considered as illustrative.

What is claimed is:

A continuous mixer comprising a casing having an inlet adjacent to one end and an outlet at the other end, a screw member rotatably mounted in said casing to advance material from said inlet to said outlet, a plate at the outlet end of said casing having orifices therein, a pair of mixing head sections adjacent to said plate and having opposed recesses in their confronting faces, clamping means detachably holding said sections and plate on the end of said casing, a rotor detachably fixed to the end of said screw member and interposed between said mixing head sections, a member fixed to said rotor adjacent to said plate having an outwardly inclined surface thereon facing towards said screw member and radial blades fixed to said inclined surface for directing the material outwardly around the periphery of said rotor, said mixing head sections and said rotor having annular rows of teeth thereon concentric with said rotor, the rows of teeth on said rotor being interposed between the rows of teeth in said sections.

References Cited in the file of this patent

UNITED STATES PATENTS

| | | |
|---|---|---|
| 458,495 | Ring | Aug. 25, 1891 |
| 1,780,067 | Cox | Oct. 28, 1930 |
| 1,862,906 | Preleuthner | June 14, 1932 |
| 2,377,069 | Brubaker | May 29, 1945 |
| 2,538,465 | Marco | Jan. 16, 1951 |
| 2,619,330 | Willems | Nov. 25, 1952 |
| 2,705,131 | Ross et al. | Mar. 29, 1955 |
| 2,731,253 | Spencer | Jan. 17, 1956 |
| 2,926,619 | Kruder | Mar. 1, 1960 |

FOREIGN PATENTS

| | | |
|---|---|---|
| 788,827 | Great Britain | Jan. 8, 1958 |